United States Patent [19]

Lance

[11] Patent Number: 5,716,098
[45] Date of Patent: Feb. 10, 1998

[54] ADJUSTABLE LUMBAR SUPPORT

[75] Inventor: Mark Andrew Lance, Williamstown, Australia

[73] Assignee: Henderson's Industries Pty. Ltd., Victoria, Australia

[21] Appl. No.: 411,669

[22] PCT Filed: Oct. 11, 1993

[86] PCT No.: PCT/AU93/00521

§ 371 Date: Jun. 9, 1995

§ 102(e) Date: Jun. 9, 1995

[87] PCT Pub. No.: WO94/08492

PCT Pub. Date: Apr. 28, 1994

[30] Foreign Application Priority Data

Oct. 12, 1992 [AU] Australia ................ PL5211
Jul. 8, 1993 [AU] Australia ................ PL9829

[51] Int. Cl.$^6$ ............................................. A47C 7/46
[52] U.S. Cl. ................... 297/284.4; 297/284.2; 297/284.3
[58] Field of Search ................ 297/284.2, 284.3, 297/284.4

[56] References Cited

U.S. PATENT DOCUMENTS

| | | |
|---|---|---|
| 3,258,259 | 6/1966 | Bohlin ................ 297/284.2 |
| 3,948,558 | 4/1976 | Obermeier et al. . |
| 4,155,592 | 5/1979 | Tsuda et al. ................ 297/284.4 |
| 4,354,709 | 10/1982 | Schuster . |
| 4,452,485 | 6/1984 | Schuster . |
| 4,462,635 | 7/1984 | Lance . |
| 4,531,779 | 7/1985 | Hashimoto . |
| 4,858,992 | 8/1989 | LaSota ................ 297/284.2 |
| 5,217,278 | 6/1993 | Harrison et al. ................ 297/284.4 |
| 5,224,757 | 7/1993 | Geitz et al. ................ 297/284.4 |

FOREIGN PATENT DOCUMENTS

| | | | |
|---|---|---|---|
| 7260987 | 11/1987 | Australia . | |
| 2003661 | 8/1971 | Germany ................ | 297/284.2 |
| 2045076 | 10/1980 | United Kingdom ................ | 297/284.2 |

*Primary Examiner*—Milton Nelson, Jr.
*Assistant Examiner*—Anthony D. Barfield
*Attorney, Agent, or Firm*—Watson Cole Stevens Davis, P.L.L.C.

[57] ABSTRACT

An adjustable lumbar support (1) for the back rest (3) of a seat is disclosed which is formed from a band which extends longitudinally across the back rest, and which supports a plurality of convex shaped support elements (10). The band incorporates regions (4, 5) which extend in the longitudinal direction of the band and there are actuators (7) for varying the effective length of at least one of the regions. Adjustment of the support (1) is effected by changing the relationship between the effective lengths of the regions causing the support elements (10) to tilt.

31 Claims, 8 Drawing Sheets

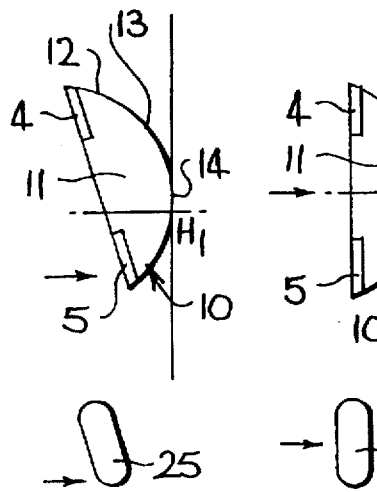 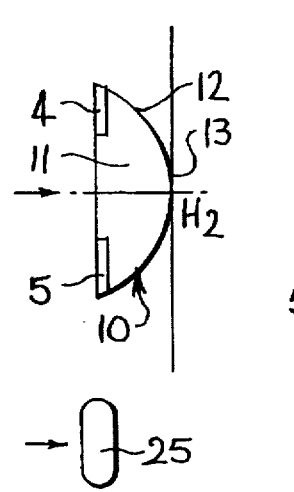 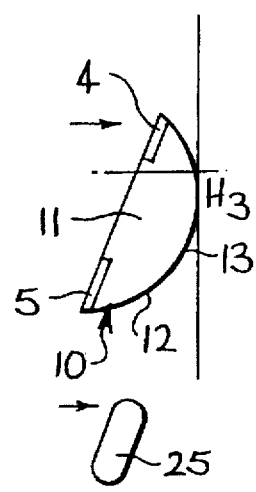 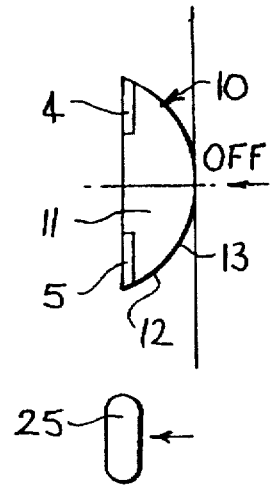
FIG 4  FIG 5  FIG 6  FIG 7
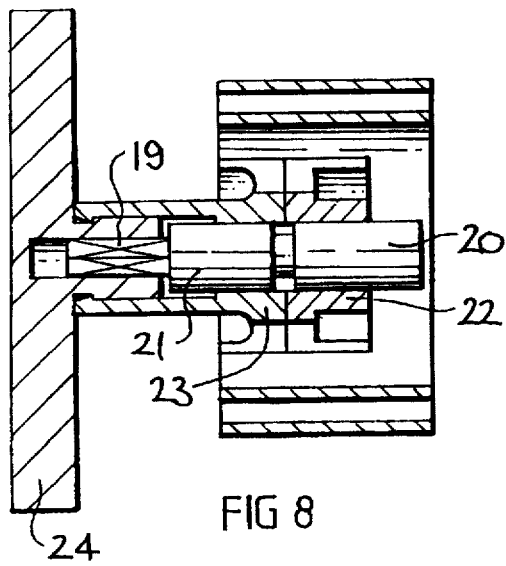 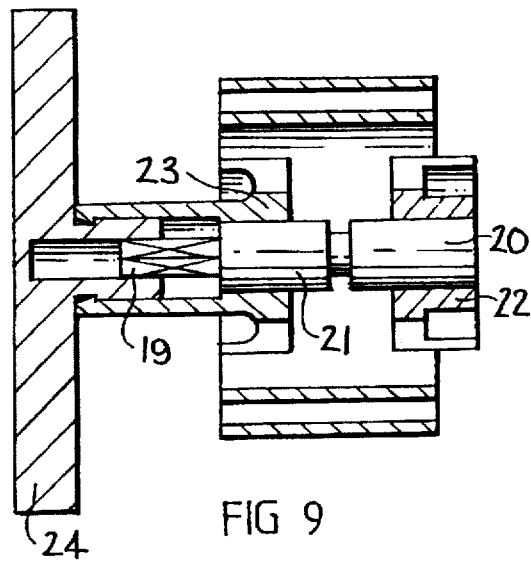
FIG 8  FIG 9

ADJUSTABLE LUMBAR SUPPORT

BACKGROUND OF INVENTION

This invention relates to lumbar supports for use in the back rest of seats, chairs and the like. The invention is specially suited for use with vehicle seats, and it will be convenient to hereinafter describe the invention with particular reference to that example use. In that regard, the word "vehicle" is to be understood as embracing vehicles of all kinds including aircraft, water borne vehicles and land vehicles.

It is well known to provide adjustable lumbar supports in vehicle seats, and especially in the seat to be occupied by the vehicle driver. Such adjustable supports take a variety of forms, and the manner of achieving adjustment also varies widely. The adjustment is generally such that it varies the effective length of the support and/or its stiffness, and thereby influences the extent to which the support curves rearwards in response to pressure applied by the user of the vehicle seat. That is, the support may provide a relatively flat or deeply curved support for the vehicle seat occupant, according to the level of adjustment of the support.

Adjustment of the foregoing kind is considered to be useful in combating driver fatigue, because it enables the driver of the vehicle to select a level of support for the lumbar region of the back, which suits that person's individual needs. Optimum benefit of that facility is hindered however, because the lumbar support generally extends transversely across the vehicle seat back rest at a fixed vertical location, and that location may not be suitable for all users of the vehicle. That location will usually be selected to suit people of a perceived normal height (torso or total) and will not be the most comfortable position for people having a height which varies above or below that normal height.

U.S. Pat. Nos. 4,354,709 and 4,452,485 (both granted to Schuster) describe apparatus for use in the back rest of a seat which includes a grid-like structure having two laterally spaced strap assemblies arranged to extend generally parallel to the upright side edges of the associated seat back rest. A series of transverse linking members interconnect the two belt assemblies, and they form the part of the apparatus to which pressure is applied by the user of the associated seat. An adjustment facility is operable to cause each of the two strap assemblies to curve outwardly between their ends to a greater or lesser extent and thereby provide a relatively flat or a relatively deeply curved support for the back of the occupant of the associated seat. A second adjustment facility is operable to shift the apex of the curve upwards or downwards as required so as to thereby vary the vertical location of the zone of primary support provided by the apparatus.

The zone of primary support as referred to throughout this specification, is to be understood as the zone extending transverse to the seat back rest along which the support structure imposes maximum resistance to deflection by the pressure imposed by the occupant of the associated seat.

In the Schuster construction, the transverse linking members provide the support for the vehicle occupant, and the associated strap assemblies serve to position some of those members further outwards or further inwards, according to the operation of the first mentioned adjustment facility. That adjustment therefore affects the extent to which an occupant of the seat will perceive the support structure to be flat or deeply curved. Operation of the second mentioned adjustment facility shifts the zone of primary support upwards or downwards by shifting the apex of the curve away from one transverse linking member and towards another.

The Schuster support structure is very complex and involves a large number of relatively movable parts. It is therefore difficult and expensive to manufacture. The Schuster support suffers the additional disadvantage that it does not provide for variation in the tension or effective length of the transverse linking members. That form of adjustment is common to adjustable lumbar supports currently in use, and is considered to be essential to achieving a suitable level of comfort for different users of the associated seat. Still further, the Schuster support is difficult to operate because separate and distinct adjustments control the degree of curvature and the vertical location of the primary support zone, and each adjustment requires separate and independent operation by the user.

It is an object of the present invention to provide a lumbar support which is adjustable and of relatively simple construction.

SUMMARY OF INVENTION

Accordingly, the present invention provides an adjustable lumbar support for use in the back rest of a seat, including a flexible band which in use extends longitudinally across the back rest so that opposite ends of the band are adjacent respective opposite sides of the back rest, the band having an upper region and a lower region which extend in the longitudinal direction of the band and are laterally spaced from one another, each region having an effective length in the longitudinal direction which in use determines the depth of rearward curvature of the respective region, and region adjusting means whereby the effective length of at least one region can be varied relative to the effective length of the other region.

In a preferred arrangement, a profile forms at least part of a front surface of the band and extends between the regions and is arranged to tilt backwards or forwards in response to a change in the relationship between the effective lengths of the regions.

Preferably the profile is arranged to have a curved or otherwise contoured outer surface, which is the surface facing the occupant of a seat with which the support assembly is used. By way of example, that surface may have a convex curvature in a direction transverse to the longitudinal direction of the band.

Preferably, the profile includes a plurality of pressure applying elements, each of which extend between the band regions. The pressure applying elements are arranged to give the desired shape to the outer surface of the profile. Preferably each element has two opposite ends, each of which is adjacent a respective region and each element has a high point which is disposed between the ends wherein in use each element faces towards the front of the back rest and the high point is located further forward of a plane contouring the longitudinal axis of each region than is any other point on the surface.

In the preferred arrangement briefly described above, each pressure applying element is adapted to tilt about a mean position in response to tilting of the profile caused by a change in the relationship between the effective lengths of the regions. That is, each element will move in a rocking like fashion if the effective length of one region is increased or decreased relative to the effective length of the other region. Such rocking movement will not occur however, if the effective length of each region is changed to the same extent at the same time.

Tilting of the elements has the effect of causing a vertical shift in the location of the primary support zone, so that that location is infintely variable between two extreme positions. When the support assembly is in use, those two extreme positions are upper and lower positions respectively.

Preferably, the band has a general effective length which in use determines the depth of rearward curvature of the band, and preferably the support is arranged such that variation in the general effective length causes a variation in the effective length of each region without causing a change in the relationship between the effective lengths of those regions. In this way, the support may be adjustable not only in the height of the zone of primary support, but also in the depth of rearward curvature.

The two band regions may be formed separately or as different regions of a single piece, according to requirements. Also, the upper region may form or include an upper longitudinal edge of the band, and/or the lower region may form or include a lower longitudinal edge of the band.

In one form of the invention, the regions are formed speparately and each region includes a respective strap-like member which extends in the longitudinal direction of the band and is laterally spaced from the other strap-like member. Preferably the adjusting means is operable to vary the effective length of, or the tension in, one or more of the strap-like members.

Throughout this specification, reference to a change in the tension of a strap-like member is to be understood as embracing a change in the effective length of the member, or a change in the degree to which the member will curve between its ends, or both.

A feature of using the strap-like members is that both the depth of rearward curvature and the vertical location of the primary support zone, are dependent upon adjustment of the tension in the strap-like members. It is therefore possible to employ a single control system for effecting adjustment of both the curvature and the vertical location.

In another form of the invention the regions are formed on a single piece, and the band has a body portion and an end portion which are relatively movable in such a way as to adjust the effective length of a region of the band as previously referred to. The two band portions could be interconnected in any suitable manner for the foregoing purpose. By way of example, that interconnection could be through a pivot connection or a hinge connection, and in either case it is preferred that the connection is remote from the region of the band which is to be adjusted.

An advantage the invention is that it is of simple construction. In a preferred form, the support may be independently adjustable both in the depth of rearward curvature as well as in the height of the zone of primary support. Furthermore, the support may have a single control for operating each of the two types of adjustment.

Notwithstanding any other forms that may fall within its scope, preferred forms of the invention will now be described by way of example only with reference to the accompanying drawings in which:

BRIEF DESCRIPTION OF DRAWINGS

FIGS. 4 to 7 are diagrammatic views along section line IV—IV in FIG. 1 of a support element in various positions and corresponding positions of an actuator button associated with an electric adjustment mechanism of the lumbar support of FIG. 1.

FIGS. 8 and 9 illustrate an alternative adjustment mechanism for the lumbar support of FIG. 1.

DETAILED DESCRIPTION OF INVENTION

Figure 1:
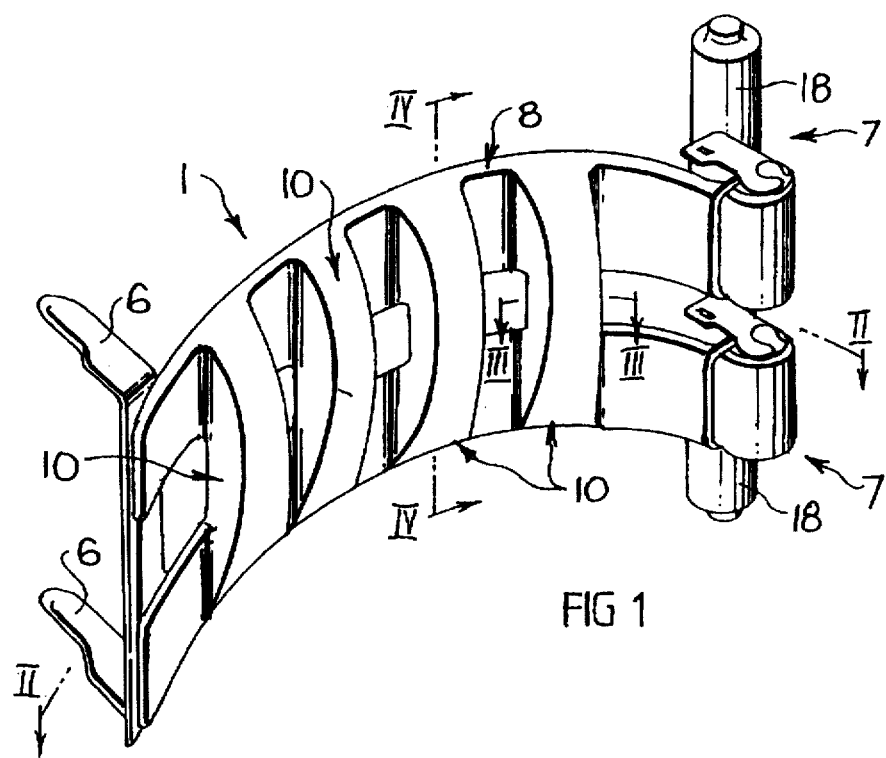
FIG. 1 is a diagrammatic perspective view of a lumbar support according to a first embodiment of the present invention.
Figure 2:
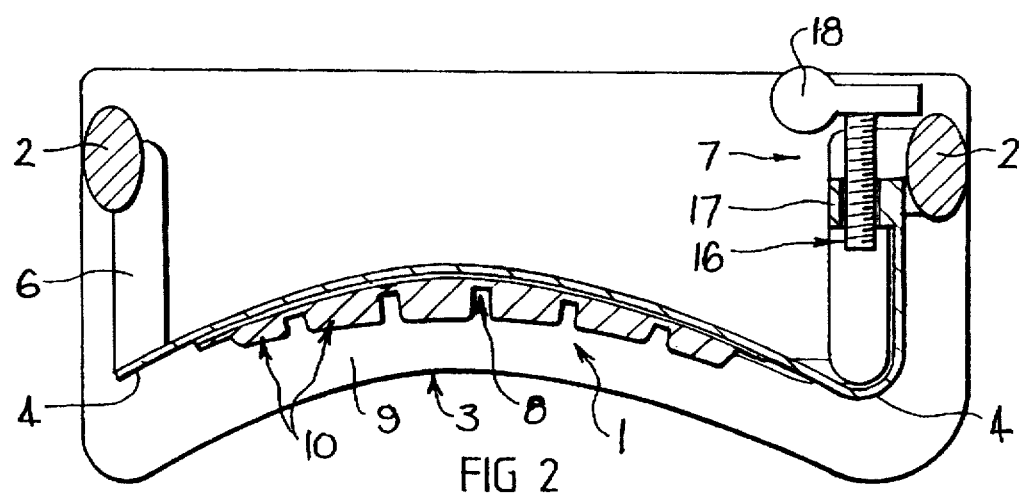
FIG. 2 is a diagrammatic view along section line II—II of the lumbar support of FIG. 1 attached to a frame of vehicle seat back rest.

FIG. 1 shows, in diagrammatic perspective view, one form of lumbar support assembly 1 which incorporates an embodiment of the invention and which is attachable to the frame 2 of a vehicle seat back rest 3, as shown diagrammatically in FIG. 2. The support assembly 1 includes upper and lower strap-like members 4 and 5 respectively, which are best seen in FIGS. 3 to 6. One end of each strap-like member 4 and 5 is fixed to a bracket 6 which is in turn secured to one side of the frame 2, and the other end of each member 4 and 5 is connected to adjustment mechanism 7 as hereinafter described. Each strap-like member 4 and 5 is formed of suitable flexible material. In use, the members 4 and 5 extend transversely between two upright sides of the frame 2 and are located in laterally spaced relationship.

A shield 8 is located over the front of each member 4 and 5 so as to be interposed between those members and foam padding 9 or another appropriate part of the seat back rest 3. The shield 8 can be formed in any suitable fashion, but is preferably moulded from a plastics material suitable to provide a wear resistant interface as hereinafter described. Also, the shield 8 preferably has flexibility such as to adapt to changing curvature of the members 4 and 5 which arises out of variation in the tension of those members. Any suitable means can be adopted to retain the shield 8 in proper location relative to the members 4 and 5.

Apart from providing a wear resistant interface between the members 4 and 5 and the seat padding, the shield 8 also improves the "feel" of the support assembly 1. The particular assembly 1 shown in the drawings is adjustable at one end only of each member 4 and 5. Consequently, in the event of adjustment of the tension in one or both of those members 4 and 5, the seat occupant is likely to "feel" movement at the side of the seat back rest adjacent to the adjustable end of the members 4 and 5. That feeling of one-sided movement tends to create a sensation of imbalance or lack of symmetry, and can disturb the comfort of the seat. The shield 8 overcomes that problem by providing a surface between the members 4 and 5 and the seat padding, and over which the members 4 and 5 can slide. The seat occupant therefore feels a symmetrical relaxation or tensioning of the support assembly 1, and comfort is not disturbed.

Figure 3:
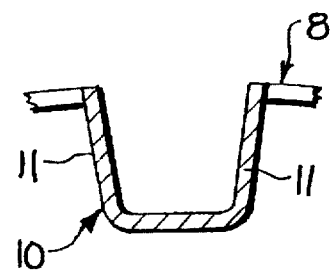
FIG. 3 is a detailed view along section line III—III in FIG. 1 of a support element of the lumbar support of FIG. 1.

The aforementioned pressure applying elements may be connected to or otherwise associated with the shield 8. In the particular arrangement shown in the drawings, those elements are formed integral with the shield 8, but that is not essential. Each element 10 is of bar-like form and extends transverse to the longitudinal direction of the members 4 and 5. It is preferred, but not essential, that each element is moulded as a hollow channel-like section having its open mouth facing towards the members 4 and 5. As shown in FIG. 3, the side walls 11 of each element 10 may diverge rearwardly so as to improve the resistance to crushing.

In the particular construction shown, the outer surface 12 of each element 10 has a convex curvature in a direction transverse to the longitudinal direction of the members 4 and 5, but those surfaces 12 could be otherwise contoured according to requirements. The curvature of each surface 12 is preferably such that each element 10 has its maximum front to back depth approximately midway in its length.

Because the elements 10 overlie the front surface of each member 4 and 5, they tend to move in response to a change in the tension of one or both of the members 4 and 5. The nature of the movement will vary according to the nature of the tension change, and FIGS. 4 to 7 illustrates some of the possibilities in diagrammatic form.

FIG. 5 shows what could be described as the mean position of an element 10. In that position, the highest point 13 of the curved surface 12 is the forward most point of the element and is the point at which greatest pressure is applied by the back of an occupant of the vehicle seat. It is a position adopted when the tension in the two members 4 and 5 is substantially the same.

If as shown in FIG. 4, the tension in the member 5 is increased beyond the tension in the member 4, each element 10 will be caused to rock so that the forward most point on the surface 12 is a point 14 located below the high point 13. If the situation is reversed so that the tension in the member 4 is greater than that in the member 5, as shown in FIG. 6, each element 10 will be caused to rock so that the forward most point of the surface 12 is a point 15 above the high point 13.

In the arrangement described above and as shown in the drawings, the forward most point of the elements 10 in effect establishes the primary support zone of the support assembly. Thus, rocking movement of the elements 10 as described above results in a vertical shift in the location of the primary support zone, and because of the curved nature of the surfaces 12 that shift is infinitely variable between two extremes.

If the tension in the two members 4 and 5 is changed to the same extent at the same time, there will be no vertical shifting of the primary support zone. That form of adjustment will however, alter the curvature of the support assembly 1, which is best seen in FIG. 2, so that it will be flatter or deeper according to the direction of the adjustment. Furthermore, the adjustment may be such that the support assembly 1 has no significant effect on the curvature of the associated back rest, and that condition is shown diagrammatically in FIG. 7.

The surface 12 of each element 10 can bear against any suitable surface within the seat back rest. There is no need for special provision to reduce friction and/or wear as there is in prior arrangements such as those of Schuster. When the elements 10 are caused to move as illustrated in FIGS. 4 to 7, their respective surfaces 12 do not slide relative to another surface against which they bear. The surfaces 12 rather tend to "walk" across the opposed surface as they rock under the influence of the members 4 and 5, and that is evident from a comparison of FIGS. 4 to 6.

It will be appreciated that the nature and/or number of the elements 10 can be varied according to requirements. It is also possible that the elements 10 may extend over and be influenced by three or more strap-like members rather than two as described above. According to yet another possible modification, the elements 10 may be omitted, in which event the shift in vertical location of the primary support zone is not infinite between extremes but is limited to particular locations. In particular, the number of possible locations of the primary support zone will therefore correspond to the number of strap-like members employed in the assembly. Also, in such a modification the shield 8 may be omitted or may be of a form different to that described above.

Adjustment of the tension in the strap-like members 4 and 5 can be achieved in any suitable manner. In the construction shown, that adjustment is achieved by varying the effective length of each member 4 and 5. Various mechanisms could be employed for that purpose, but it is preferred to employ a mechanism which quickly and easily effects a relatively large adjustment of the members 4 and 5.

In the preferred arrangement shown, two adjustment mechanisms 7 are provided, and each is associated with a respective one of the strap-like members 4 and 5. In the relatively simple arrangement diagrammatically illustrated in FIG. 2, each mechanism 7 includes a screw-threaded spindle 16 which cooperatively engages with a nut 17 attached to the respective member 4 or 5. The spindle 16 is caused to rotate by suitable drive means such as an electric motor 18, and thereby push or pull the member 4 or 5 through the nut 17 according to the direction of rotation.

FIGS. 8 and 9 show another form of the adjustment mechanism 7 in which the drive spindle 19 has threaded portion 20 and 21 at each of two opposite ends. The portions 20 and 21 have threads of opposite hand, and each cooperatively engages with a respective nut 22 and 23, both of which are secured against rotation with the spindle 19. Because of the different hand of the two threaded portions 20 and 21, rotation of the spindle 19 in one direction draws the nuts 22 and 23 towards one another as shown in FIG. 8, whereas rotation in the opposite direction moves those nuts apart as shown in FIG. 9. Because of the simultaneous relative axial movement of the two nuts 22 and 23, there is relatively large variation in their relative positions for a relatively small rotation of the spindle 19.

The nut 22 of each mechanism 7 may be secured to a respective one of the strap members 4 and 5, and the nut 23 of each mechanism 7 may be secured in an appropriate fashion to a relatively fixed structure such as the back rest frame 2. Rotation of each spindle 19 therefore increases or decreases the effective length, and consequently the tension, of the respective member 4 or 5.

Rotation of the spindles 19 can be controlled in any fashion. By way of example, the spindles 19 may be each driven by a respective electric motor (not shown), or a handwheel 24 as shown. In the event of an electric motor drive, an actuator button 25 (FIGS. 4 to 7) may be arranged so as to be selectively operable to cause operation of either motor, or both motors simultaneously. FIGS. 4 to 7 show one way in which the button 25 can be manipulated for the three different forms of motor operation. As a result, single control means is operative to effect both the adjustment in the tension of the support structure and the adjustment in the vertical location of the primary support zone.

Figure 10:
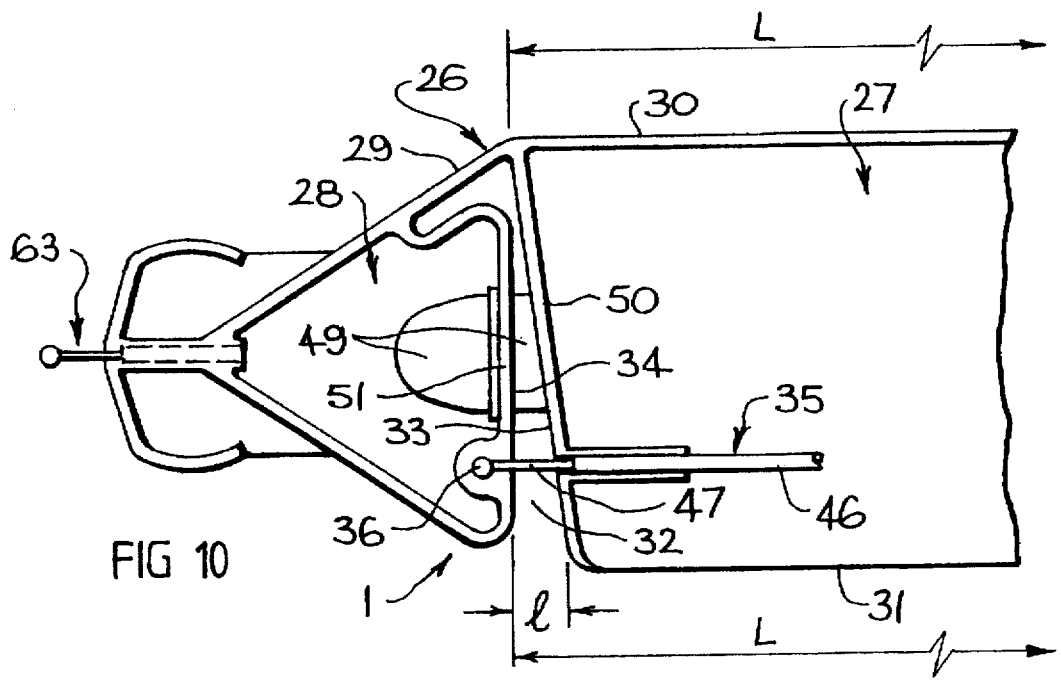
FIG. 10 is a detailed view of a band of a lumbar support according to a second embodiment of the present invention, with a region having an extended effective length.

FIG. 10 shows part only of a lumbar support 1 which is made in accordance with a second embodiment of the invention. The support 1 includes a band 26 having a body portion 27 and an end portion 28 which are connected through means which permits relative movement of the two portions 27 and 28. In the arrangement shown, the connecting means includes a flexible hinge 29 which is formed integral with both portions 27 and 28 and is located adjacent one longitudinal edge 30 of the body portion 27. Other forms of connection could be employed.

In the particular arrangement shown, the band includes an adjustable region extending along the longitudinal edge 31 of the body portion 27. The adjustment is made possible, in the arrangement shown, by the wedge shaped space 32 provided between an end surface 33 of the body portion 27 and an adjacent surface 34 of the end portion 28. As shown, those surfaces 33 and 34 diverge in a direction which extends away from the longitudinal edge 30 and towards the opposite longitudinal edge 31.

It is preferred, but not essential, that the end part of the band 26 opposite to that shown in FIG. 10 is constructed in the same manner as the particular end part shown. That is, it includes an end portion hingedly connected to the body portion 27 adjacent the longitudinal edge 30 of that body portion, and which is separated from the body portion 27 by a space corresponding to the space 32 shown in FIG. 10.

The effective length of the longitudinal edge 30 is represented in FIG. 10 by the symbol "L". In the condition of the band 26 as shown in FIG. 10, the longitudinal edge 31 has a corresponding effective length "L".

Figure 11:
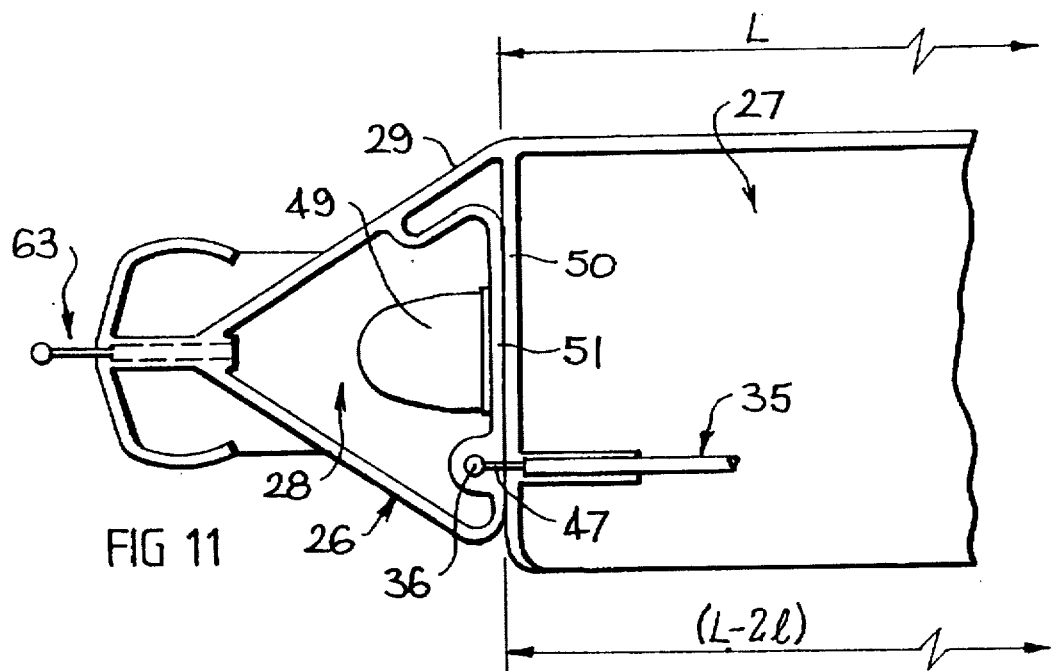
FIG. 11 illustrate the band of FIG. 10 with the region having a contracted effective length.

FIG. 11 shows another condition of the band 26 in which the end surface has been moved against the adjacent surface 34. In that condition of the band 26, the longitudinal edge 31 has an effective length which is reduced by an amount equal to the maximum separation of the surfaces 33 and 34, which is represented by the symbol "l" in FIG. 10. Assuming the same change in condition is carried out at both ends of the band 26, the resulting effective length of the longitudinal edge 31 will be equal to ("L" minus 2 "l").

Figure 12:
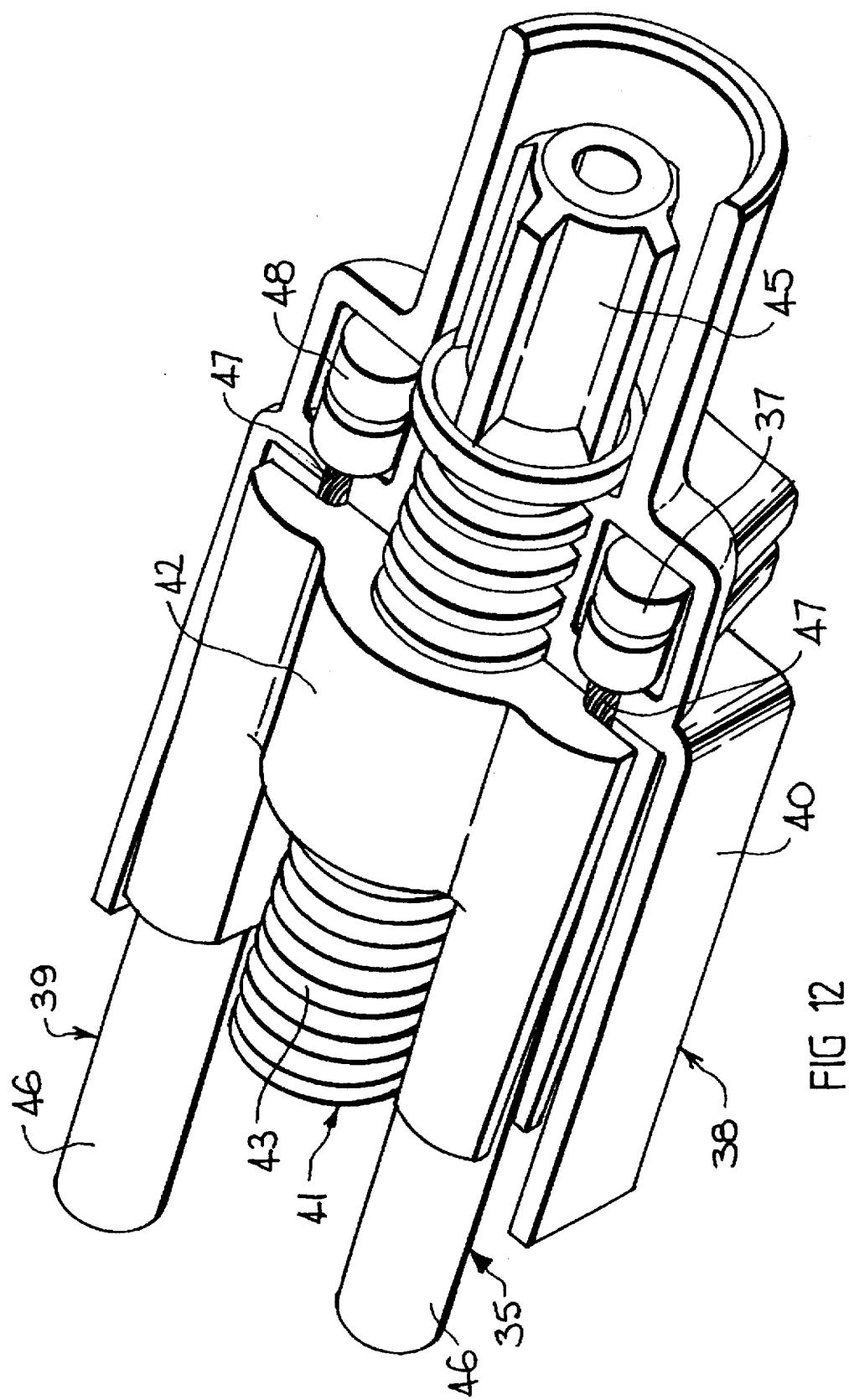
FIG. 12 shows a detailed view of a cable adjusting mechanism of the lumbar support of FIG. 10.

Any suitable actuating means may be adopted to produce a change in the effective length of the longitudinal edge 31. In the particular arrangement shown, that means includes a flexible cable 35 attached at one end 36 to the end portion 28, and attached at an opposite end 37 to actuator mechanism 38, an example of which is shown in FIG. 12. A similar cable 39 (FIG. 12) is connected to the end of the band 26 not shown in FIGS. 10 and 11.

The particular mechanism 38 shown in FIG. 12 includes a housing 40 which can be fixed to a seat structure or other support, and a threaded shaft 41 rotatably mounted within the housing 40. A carriage 42 is mounted within the housing 40 for relative movement in the axial direction of the shaft 41, and the threaded portion 43 of the shaft 41 extends axially through the carriage 42 and cooperatively engages with an internal thread of that carriage. The carriage 42 is mounted within the housing 40 so as to be held against rotation with the shaft 41, and the shaft 41 is mounted on the housing 40 so as to be held against relative axial movement.

As a result, rotation of the shaft 41 causes movement of the carriage 42 relative to the housing 40 in the axial direction of the shaft 41.

Rotation of the shaft 41 can be effected in any appropriate manner, such as manually or through an electric or hydraulic motor. In the arrangement shown, a hand wheel 44 (FIG. 13) is connected to an end 45 of the shaft 41 so as to enable manual rotation of the shaft.

Each of the cables 35 and 39 includes a tubular cover 46 and a wire core 47 slidable axially within that cover. The cable ends 36 and 37 are secured to the core 47 of the cable 35. Similar ends are secured to the core 47 of the cable 39, and one of those ends 48 is shown in FIG. 12. Opposite ends of each cable cover 46 bear against the carriage 42 and the band body portion 27 respectively, so that movement of the carriage 42 as referred to above controls the size of the space 32 at each end of the body portion 27.

It will be appreciated that other actuating arrangements could be adopted, including cable arrangements different to that particularly described above.

One possible variation of the mechanism 38 is to utilise an arrangement as described in the first embodiment in connection with FIGS. 8 and 9. That is, the shaft 41 may have two threaded portions of opposite hand which cooperate with two relatively movable parts of the mechanism. Such an arrangement increases the axial adjustment of a cable for a given degree of rotation of the threaded shaft.

Given the flexibility of the hinge 29, it is preferred that guide means be provided between the body and end portions 27 and 28 of the band 26 so as to retain those portions in a proper relationship. In the particular construction shown by FIGS. 10 and 11, such guide means includes a tongue 49 which is attached to or formed integral with the end 50 of the body portion 51 and which slides in a slot (not shown) formed in an end wall 51 of the end portion 28. The arrangement is such that the tongue 49 and slot cooperate so as to maintain the body portion end 50 in a substantially straight path of movement during a change between the conditions shown in FIGS. 10 and 11 respectively.

Figure 14:
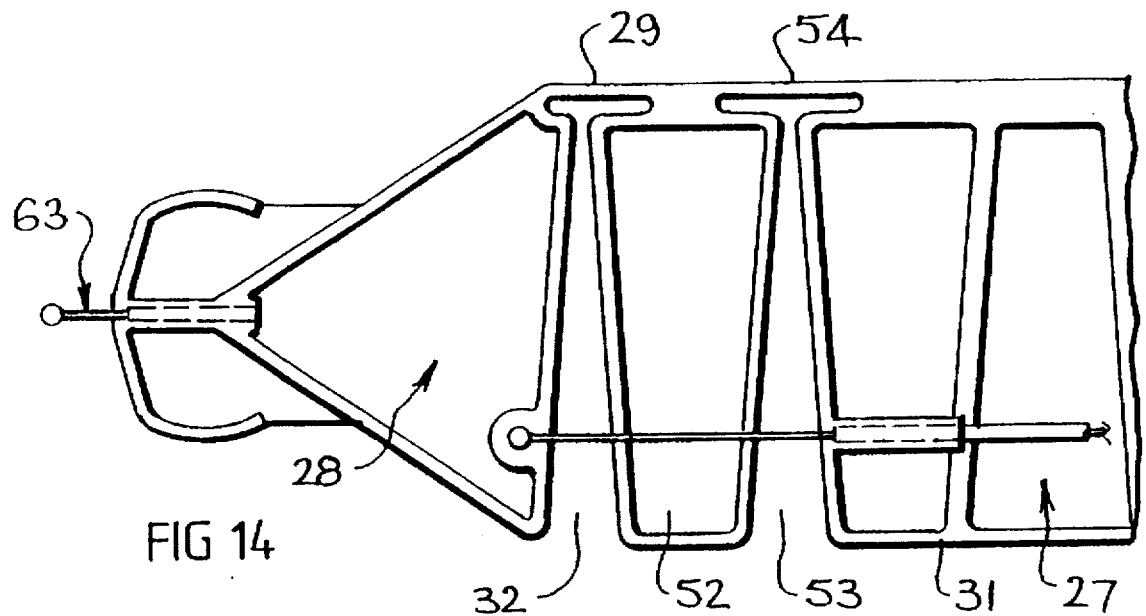
FIG. 14 is a variation of the band of FIG. 10 incorporating an intermediate band portion.

FIG. 14 shows a possible variation of the arrangement shown in FIGS. 10 and 11. In that variation there is an intermediate band portion 52 located between the body portion 27 and the end portion 28. The space 32 is formed between the band portions 28 and 52, and a similar space 53 is formed between the band portions 52 and 27. Furthermore, there are two flexible hinges 29 and 54 which connect the intermediate portion 52 to the end portion 28 and the body portion 27 respectively. Such an arrangement will operate in the manner described in relation to FIGS. 10 and 11, and has the advantage of providing a greater degree of adjustment in the effective length of the longitudinal edge 31.

It will be appreciated that more than one intermediate portion 52 could be used so as to further increase the degree of adjustment of the longitudinal edge 31.

Figure 15:
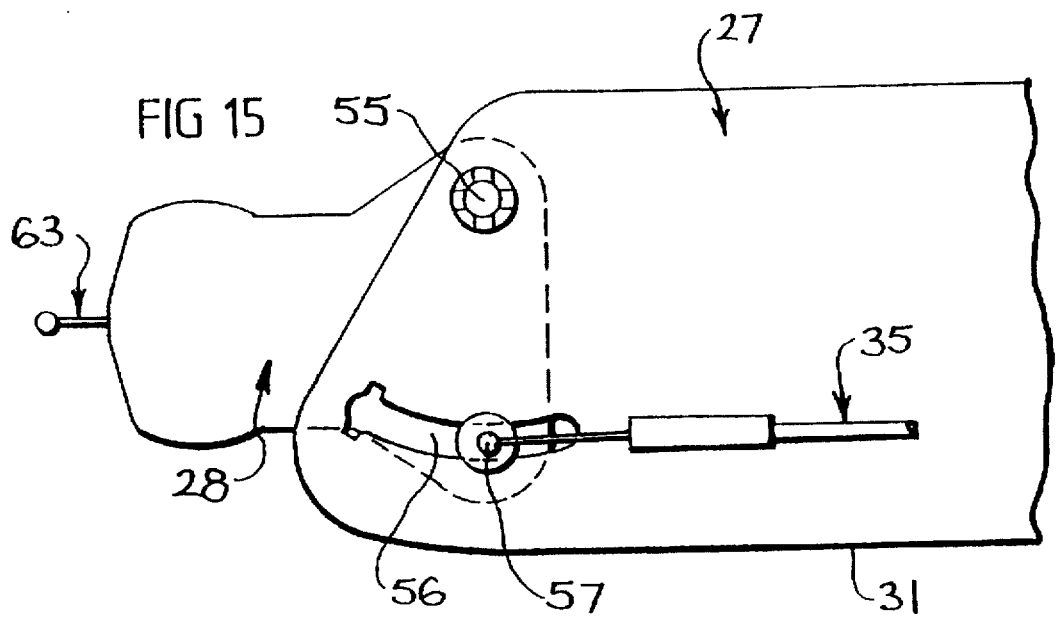
FIG. 15 is a detailed view of a band of a lumbar support according to a third embodiment of the present invention.

FIG. 15 shows a third embodiment of the invention in which the end portion 28 is connected to the body portion 27 through a pivot 55 rather than a hinge as described in connection with the embodiments of FIGS. 10, 11 and 14. Furthermore, the guide means includes a curved guide slot 56 formed in the body portion 27 and a guide pin 57 which is attached to the end portion 28 and is slidably located in the slot 57. The effective length of the longitudinal edge 31 is determined by the position of the pin 57 relative to the ends of the slot 56. In all other respects, the FIG. 15 arrangement may operate as described in connection with FIGS. 10 to 14.

Figure 13:
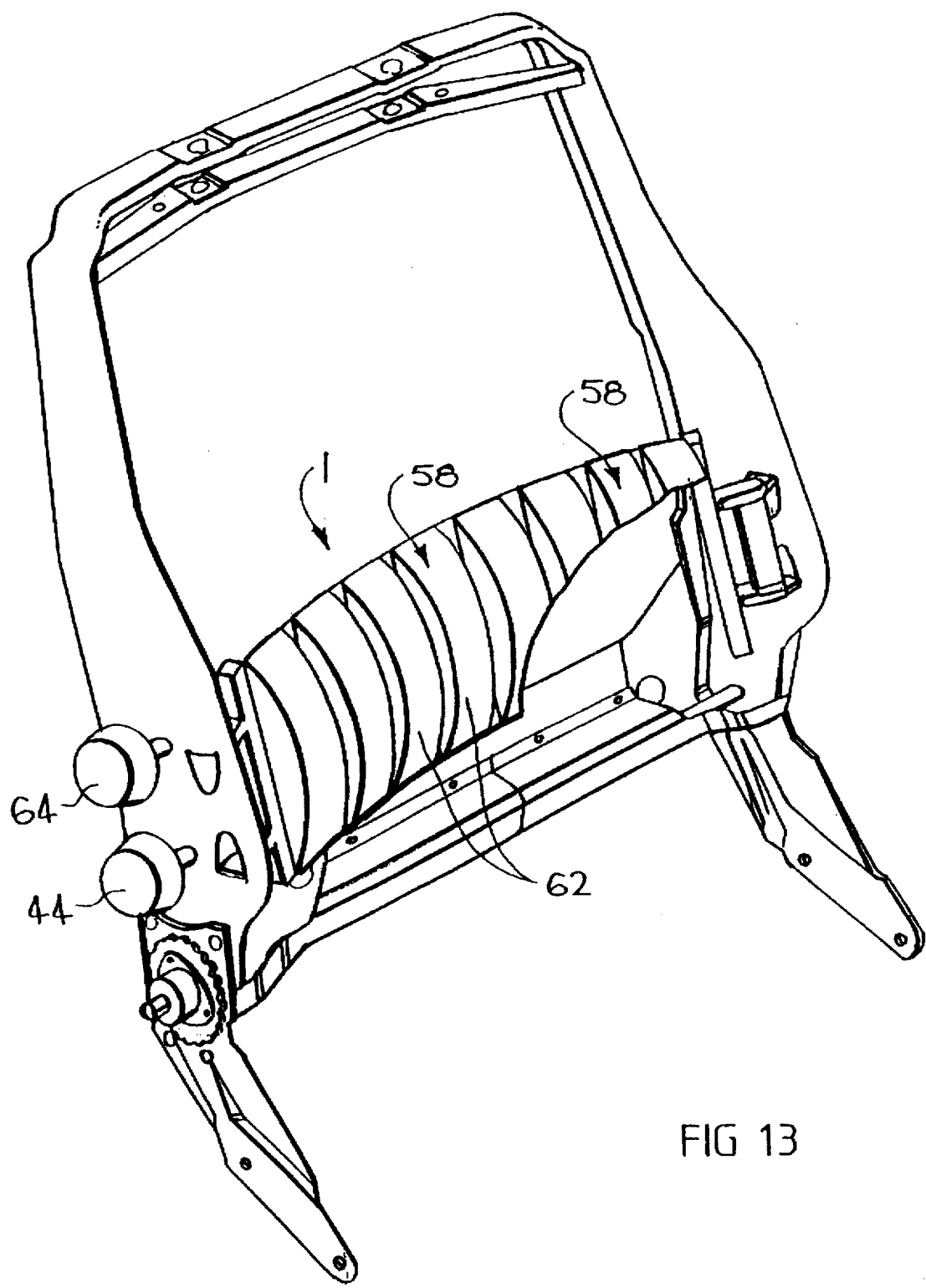
FIG. 13 is a diagrammatic perspective view of the lumbar support of FIG. 10 installed in a vehicle seat.

In the second and third embodiments described, adjustment of the longitudinal edge 31 affects the height at which primary support zone of the lumbar support 1 is positioned relative to the seat back rest. That change in height of the zone may be achieved in a manner similar to that described in the first embodiment. In particular, as shown in FIG. 13, a plurality of curved elements 58 may extend between the longitudinal edges 30 and 31 of the band 26, and those elements are arranged such that a change in the effective length of the edge 31 causes each element to "rock" backwards or forwards as diagrammatically represented by FIG. 16.

Figure 16:
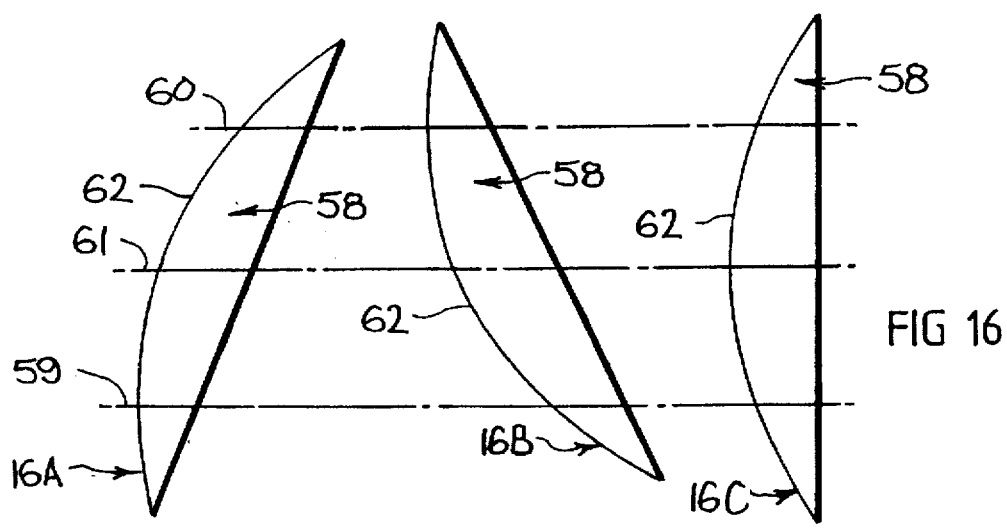
FIGS. 16, 16a, 16b, and 16c illustrate in diagrammatic form various positions of the support elements and the various shapes of the band of the lumbar support of FIG. 10 or 15.

FIG. 16 also illustrates the band 26 of FIG. 15 in various adjusted positions. In these illustrations, both ends 28 of the band are adjustable and of similar construction.

When the effective length of the edge 31 is at a minimum, as illustrated in the diagrammatic perspective view of the band 26A, each element 58 will have a disposition as shown by representation 16A of FIG. 16, and the zone of primary support will then be at the level 59. When the effective length of the edge 31 is at a maximum, as shown in the diagrammatic perspective view of the band 26B, each element 58 will have a disposition as shown by representation 16B of FIG. 16, and the zone of primary support will be at the level 60. When the effective length of the edge 31 is intermediate the maximum and minimum lengths, as shown in the diagrammatic perspective view of the band 26C, each element 58 will have a disposition as shown by representation 16C of FIG. 16, and the zone of primary support will be at the level 61. As will be seen from FIG. 16, "rocking" movement of the element 58 causes the curved surface 62 of the element to tilt and thereby shift vertically the zone of forward most projection of that surface. It is that shift vertically which produces a shift in the location of the zone of primary support.

Figure 17:
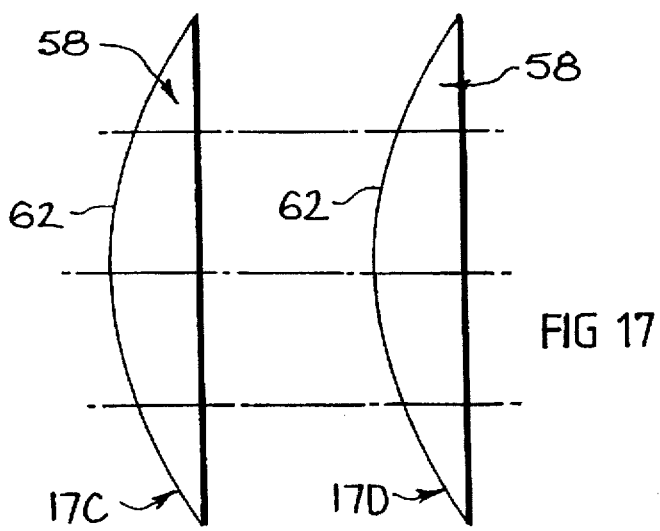
FIG. 17 illustrates the adjustment of rearward curvature of the lumbar support of FIG. 10 or 15.

It is also preferred to provide means whereby the degree of rearward curvature of the primary support zone can be adjusted. In FIG. 17, representations 17C and 17D indicate the position of a particular element 58 when the primary support zone is at minimum and maximum rearward curvature respectively. Adjustment of that curvature will be hereinafter referred to as the basic adjustment of the lumbar support 1, and it is to be understood that such basic adjustment can be carried out while each element 58 is tilted from the upright disposition shown by representations 17C and 17D.

Any suitable means could be employed to affect the basic adjustment. In the particular embodiments shown, that adjustment is achieved by use of a cable 63 connected between the band 26 and suitable actuating mechanism (not shown) which could be as described in connection with FIG. 12. A hand wheel 64 for that further mechanism is shown in FIG. 13.

Figure 18:
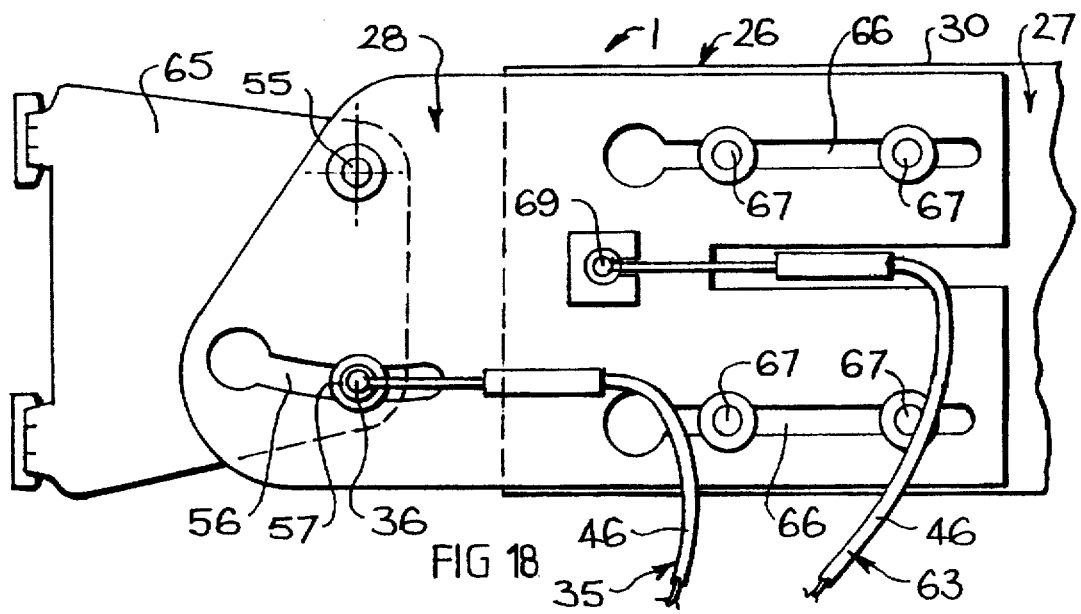
FIGS. 18 and 19 illustrate a band of a lumbar support according to a fourth embodiment of the present invention.
Figure 19:
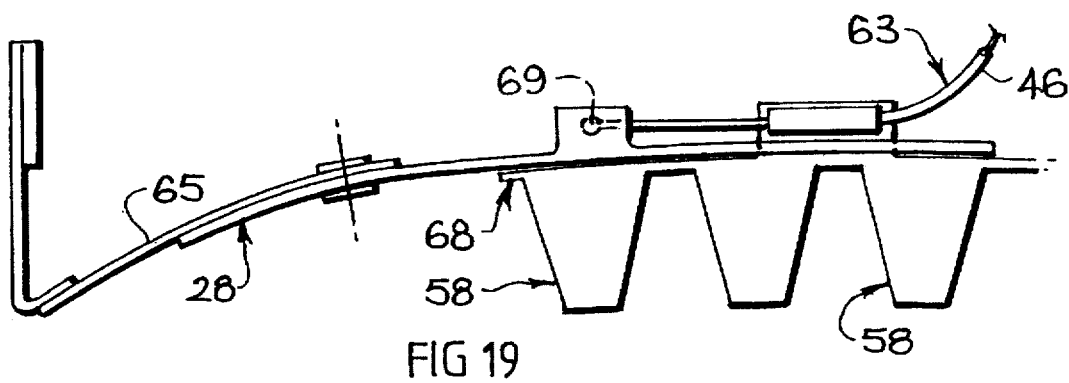

FIGS. 18 and 19 show a variation of the arrangement shown in FIG. 15. In that variation, the band 26 includes a body portion 27 and an end portion 28 which are interconnected for relative movement as hereinafter described. The end portion 28 is in turn connected to a mounting part 65 which is attached to or forms part of the back rest frame of the seat to which the support 1 is attached.

It is a feature of the arrangement shown in FIGS. 18 and 19 that adjustment of the location of the zone of primary support is affected by relative movement of the band 26 and the mounting part 65, whereas adjustment of the curvature of the band 26 (the basic adjustment) is effected by relative movement of the band portions 27 and 28. In an alternative arrangement, shown in FIG. 20, the basic adjustment may be effected by the first mentioned relative movement, in which event the primary support zone adjustment is effected by the second mentioned relative movement.

Considering the particular arrangement shown in FIGS. 18 and 19, the primary support zone adjustment involves movement of the band 26 about a pivot 55 which forms part of the connection between the mounting part 65 and the band end portion 28. A guide pin 57 attached to the mounting part 65 may slidably locate in a curved slot 56 formed through the end portion 28 so as to assist in controlling the relative movement between the part 65 and portion 28. In the particular arrangement shown, that relative movement is also controlled by a flexible cable 35 having an end 36 attached to the guide pin 57 or another part of the mounting part 65. An end of the cable cover 46 engages a surface of the band end portion 28 so that adjustment of the cable 35 causes the band 26 to move relative to the mounting part 65 about the pivot 55.

Adjustment of the effective length of the band 26 can be effected in any suitable manner, and FIGS. 18 and 19 show one example arrangement for that purpose. In that arrangement, the band portions 27 and 28 overlap to some extent and are able to move relative to one another. Guide means acts between the overlapping regions of the band portions 27 and 28 to limit the relative movement to movement generally in the longitudinal direction of the band 26. In the example shown, that guide means includes two slots 66 formed through the band 26, and at least one guide pin 67 slidably located in each of the slots 66. It will be appreciated that other guide arrangements could be adopted.

As shown in FIG. 18, each of the guide slots 66 is substantially straight, extends generally in the longitudinal direction of the band 26, and is located adjacent a respective longitudinal edge 30 and 31 of the band 26. In the arrangement shown, each of the slots 66 extends through the overlapping region of both band portions 27 and 28. The or each guide pin 67 which engages in a particular slot 66 may be attached to another portion 68 of the support 1 which carries or forms the elements 58.

Relative movement of the two band portions 27 and 28 may be controlled by a flexible cable 63 having an end 69 attached to the band end portion 28, and an end of that cable cover 46 engages an opposed surface of the band body portion 27. Obviously, the relationship of the cable end 69 and the end of the cover 46 could be reversed so that they cooperate with the band portions 27 and 28 respectively.

Figure 20:
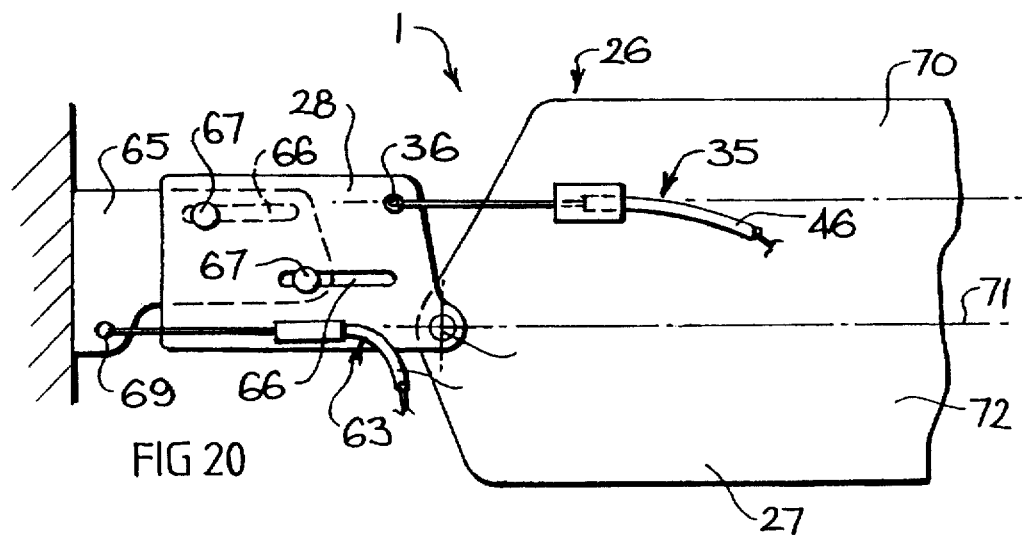
FIG. 20 illustrates a band of a lumber support according to a fifth embodiment of the present invention.

FIG. 20 shows an alternative arrangement to the lumbar support of FIGS. 18 and 19, where the basic adjustment is effected by relative movement of the band 26 and the mounting part 65, whereas adjustment of the primary support zone is effected by relative movement of the band portions 27 and 28.

As illustrated in FIG. 20, the mounting part 65 and the end portion 28 overlap to some extent and are able to move relative to one another. Similar to the arrangement of FIGS. 18 and 19, guide means act between the overlapping regions to limit the relative movement to movement generally in the longitudinal direction of the band. However as distinct from the earlier embodiment, in this arrangement the relative movement is between the mounting part 65 and the band 28. In the arrangement shown, that guide means includes two slots 66, one formed through the end portion 28 of the band 26, and the other formed through the mounting part 65. The guide means also include guide pins 67 slidably located in each of the slots 66 and each guide pin 67 is secured to the other of the mounting part or end portion through which the corresponding guide slot is formed. As each of the guide slots 66 is substantially straight and extends generally in the longitudinal direction of the band 26, the mounting part 65 and the end portion 28 are able to move relative to each other in the longitudinal direction of the band.

Relative movement of the end portion 28 and the mounting part 65 is controlled by a flexible cable 63 having an end 69 attached to an extension of the mounting part 65, and an end of that cable cover 46 engages the end portion 28 of the band.

Adjustment of the primary support zone is effected by relative movement of the band portions 27 and 28 about a pivot 55 which interconnects the body portion 27 and the end portion 28. To control the relative movement between the band portion 27 and 28, a flexible cable 35 is provided and has an end 36 attached to the end portion 28 and a cable cover 46 engages the body portion 27 so that adjustment of the cable 35 causes the body portion 27 to pivot relative to the end portion 28 about the pivot 55. Obviously, the relationship of the cable end 36 and cover 46 could be reversed.

Figures 16A, 16B, 16C:
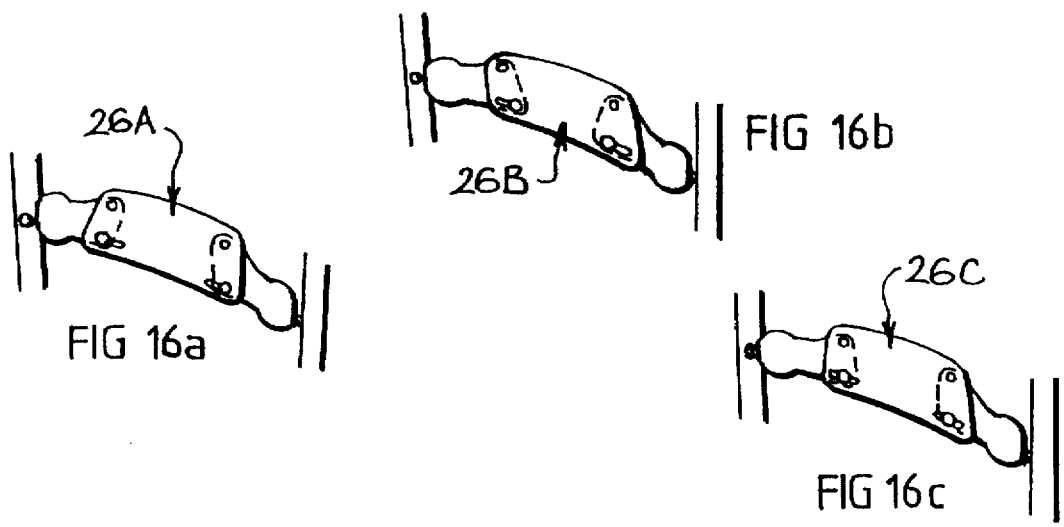

As distinct from the embodiments of FIGS. 10, 15 or 18 where the bottom edge 31 of the band has the greatest variation in effective length, in the arrangement as shown in FIG. 20, the band 26 is constructed such that the effective length of the upper region 70 of the band varies to a greater extent then the lower region 72 on pivoting of the end portion 28 relative to body portion 27. The effective length of the region 71 through the pivot 55 remains constant. In relation to FIG. 16, when the effective length of the upper region 70 is at a minimum, the elements 58 have a disposition as represented in FIG. 16B, and when the effective length of the upper region 70 is at a maximum, the elements 58 have a disposition as represented in FIG. 16A. Therefore, the principle of the operation of the band is the same and in all other respects, the FIG. 20 arrangement may operate as described in connection with the earlier embodiments.

In particular, in the arrangement where the end part of the band 26 opposite to that shown in FIGS. 18 or 20 is constructed in the same manner as the particular end part shown, the cables 35 and 63 from both ends are actuated through appropriate mechanisms, such as those shown in FIGS. 8 and 9 or 12, with rotation of these mechanisms being typically effected either manually or by electric, or hydraulic means.

As will be appreciated, other actuating arrangements could be adopted to adjust the lumbar support, including various cable arrangements. In particular, the cables may be either the "push-pull" type, i.e. where the cables are operable under either a compressive force or a tensile force, or may be of the "pull only" type, i.e. where they are operable only under tension. If they are of the later type, then the support 1 is configured such that the cables, once secured to the band, are maintained in tension either by internal forces within the band, such as the bias generated by the hinge 26, or by external forces such as the pressure applied to the band by an occupant of the associated seat.

It will be understood from the foregoing description that the present invention provides an extremely simple yet effective means for achieving vertical and basic adjustment of the zone of primary support of a lumbar support system. The invention is applicable to situations in which adjustment is effected manually or mechanically.

Finally, it is to be understood that various alterations, modifications and/or additions may be introduced into the constructions and arrangements of parts previously described without departing from the spirit or ambit of the invention.

I claim:

1. An adjustable lumbar support for use in the back rest of a seat, including a flexible strap-like band adapted to extend longitudinally across a said back rest so that opposite ends of the band are adjacent respective opposite sides of the back rest, said band having a primary support zone and also having an upper region and a lower region which are spaced from one another, said primary support zone and each said upper and lower region extending in the longitudinal direction of said band, each said region having an effective length in said longitudinal direction which determines the depth of a rearward curvature of the respective said region, a plurality of elements each of which extends between said upper and lower regions and has a profiled surface which forms part of a front surface of said band, said elements being spaced apart in the longitudinal direction of said band, and region adjusting means operative to vary said effective length of at least one said region relative to the effective length of the other said region and thereby cause said elements to tilt forwards or backwards, whereby the location of said zone of primary support is shifted towards or away from said upper region according to the direction of said tilting movement.

2. An adjustable lumbar support according to claim 1 wherein each said element has two opposite ends each of which is adjacent a respective said region, said profiled surface of each said element has a high point which is disposed between the ends of the respective said element, and is located further forward of a plane containing the longitudinal axis of each said region than is any other point on the profiled surface.

3. An adjustable lumbar support according to claim 2, wherein each said profiled surface has a convex curvature.

4. An adjustable lumbar support according to claim 2, wherein said elements are interconnected through integral webs and are formed of a plastics material.

5. An adjustable lumbar support according to claim 1, wherein said band has a general effective length which determines the depth of rearward curvature of said band at said primary support zone, adjusting means being provided to enable variation of said general effective length, and variation in said general effective length causes a variation in the said effective length of each said region without causing a change in relationship between the effective lengths of those regions.

6. An adjustable lumbar support according to claim 1, wherein each said region includes a respective strap-like member which extends in the longitudinal direction of said band and is laterally spaced from the other said strap-like member.

7. An adjustable lumbar support according to claim 1 including a shield which is located over at least part of said front surface of said band, and at least part of said band is able to move longitudinally relative to said shield.

8. An adjustable lumbar support according to claim 7, wherein said elements form an integral part of said shield, and said shield is moulded from a plastics material.

9. An adjustable lumbar support according to claim 1, wherein said band includes at least one end portion and a body portion, said end portion forming a said end of said band, each said portion forming a respective part of the said effective length of each said region, and means connecting said portions so as to permit relative movement between said portions.

10. An adjustable lumbar support according to claim 9, including a mounting part at least at one said end of the band, and said end portion is attached to said mounting part so as to be movable relative thereto.

11. An adjustable lumbar support according to claim 9, including two said end portions, each of which forms a respective said end of the band.

12. An adjustable lumbar support according to claim 11, including two mounting parts, and each said end portion is attached to a respective one of said mounting parts so as to be movable relative thereto.

13. An adjustable lumbar support according to claim 12, wherein said relative movement between a said end portion and the respective said mounting part is relative movement in the longitudinal direction of said band and causes a variation in a general effective length of said band.

14. An adjustable lumbar support according to claim 12, wherein said relative movement between a said end portion and the respective said mounting part causes a change in the relationship between the effective lengths of said regions.

15. An adjustable lumbar support according to claim 14, wherein said relative movement between the end portion and the mounting part is movement about an axis of rotation.

16. An adjustable lumbar support according to claim 9, wherein said relative movement between the end and body portions of the band causes a change in the relationship between the effective lengths of said regions.

17. An adjustable lumbar support according to claim 16, wherein said change in relationship involves a reduction in the said effective length of one said region and a simultaneous extension of the effective length of the other said region.

18. An adjustable lumbar support according to claim 9, wherein said connecting means is an integral hinge.

19. An adjustable lumbar support according to claim 9, wherein said connecting means is a pivotal connection.

20. An adjustable lumbar support according to claim 9, wherein said relative movement between the end and body portions of the band is movement in the longitudinal direction of the band and causes a variation in a general effective length of said band.

21. A seat assembly comprising an adjustable lumbar support for use in the back rest of a seat, including a flexible strap-like band adapted to extend longitudinally across a said back rest so that opposite ends of the band are adjacent respective opposite sides of the back rest, said band having a primary support zone and also having an upper region and a lower region which are spaced from one another, said primary support zone and each said upper and lower region extending in the longitudinal direction of said band, each said region having an effective length in said longitudinal direction which determines the depth of a rearward curvature of the respective said region, a plurality of elements each of which extends between said upper and lower regions and has a profiled surface which forms part of a front surface of said band, said elements being spaced apart in the longitudinal direction of said band, and actuator means operative to vary said effective length of at least one said region relative to the effective length of the other said region and thereby cause said elements to tilt forwards or backwards, whereby the location of said zone of primary support is shifted towards or away from said upper region according to the direction of said tilting movement.

22. A seat assembly according to claim 21, wherein said actuator means includes two adjustment mechanisms each of which is operable to cause variation in the effective length of a respective one of said regions.

23. A seat assembly according to claim 22, wherein said actuator means includes at least one electric motor which is operatively connected to one of said mechanisms.

24. A seat assembly according to claim 23, wherein two said electric motors are provided and each is operatively connected to a respective one of said mechanisms.

25. A seat assembly according to claim 22, wherein said actuator means includes at least one hand wheel which is connected to one of said mechanisms.

26. A seat assembly according to claim 25, wherein two said hand wheels are provided and each is connected to a respective one of said mechanisms.

27. A seat assembly according to claim 22, wherein said mechanisms are located remote from said band and each is connected to a respective said region through a respective flexible drive connection.

28. A seat assembly according to claim 27, wherein each said flexible drive connection includes a flexible cable having a tubular outer cover and a core which is movable longitudinally relative to said cover.

29. A seat assembly according to claim 28, wherein at least one of the flexible drives is operable by the application of either a compressive or tensile force to the cable.

30. A seat assembly according to claim 29, wherein in use, tension is maintained in the cable of the flexible drive by the pressure applied to the band by an occupant of the seat assembly.

31. A seat assembly according to claim 28, wherein at least one of the flexible drives is operable only by application of tensile force to the cable.

* * * * *